Sept. 16, 1969  P. G. BAILEY  3,466,842
MACHINE FOR TREATING CAPSULES
Filed May 10, 1967  7 Sheets-Sheet 1
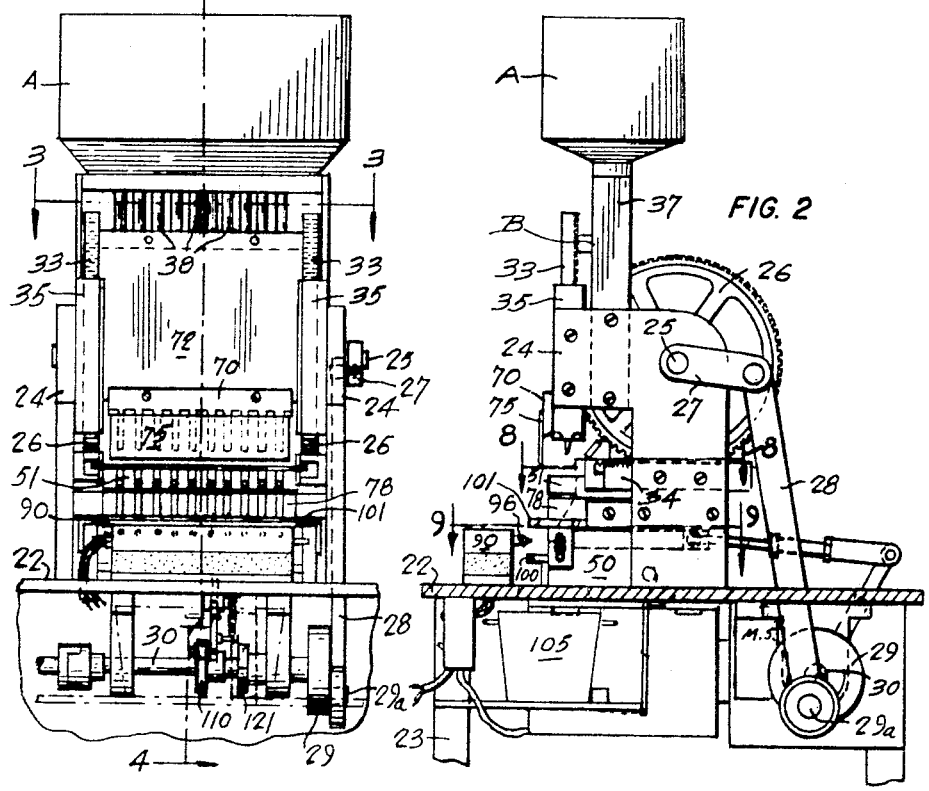
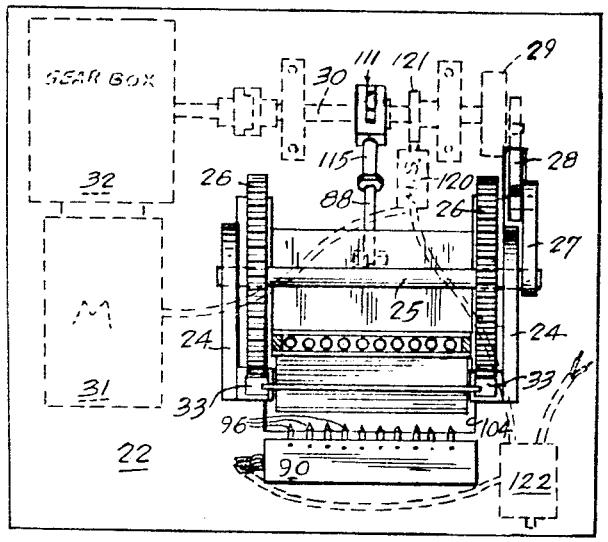
INVENTOR
Philip G. BAILEY
ATTORNEY

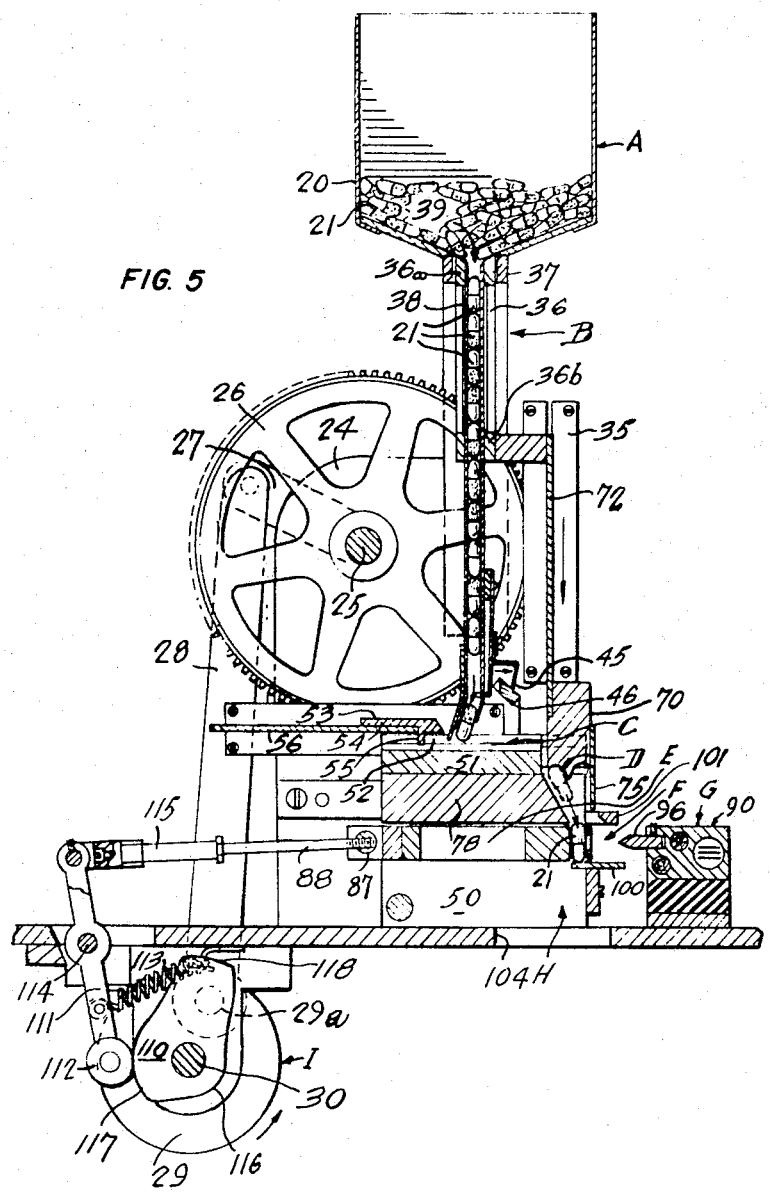

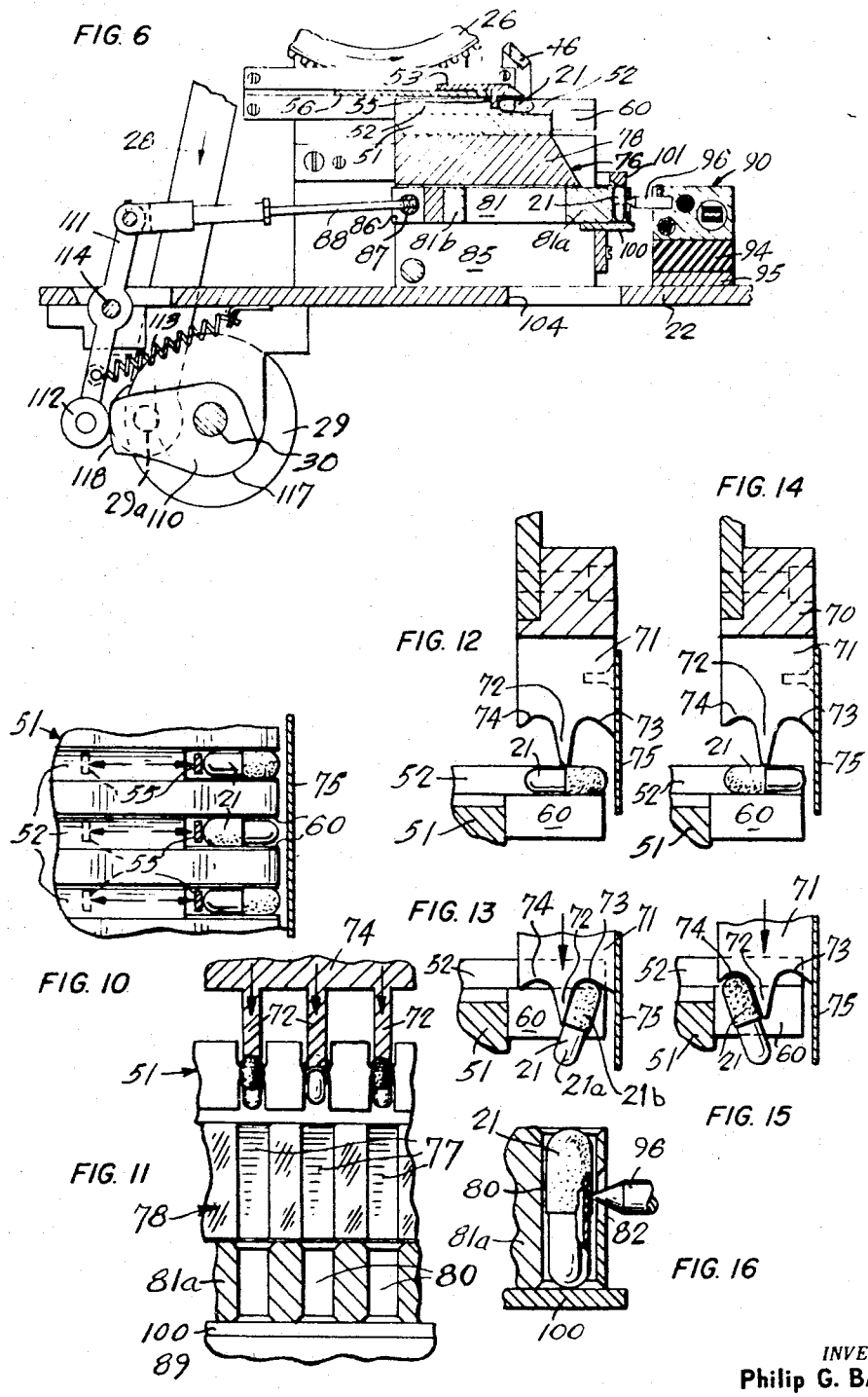

Sept. 16, 1969  P. G. BAILEY  3,466,842
MACHINE FOR TREATING CAPSULES
Filed May 10, 1967  7 Sheets-Sheet 5
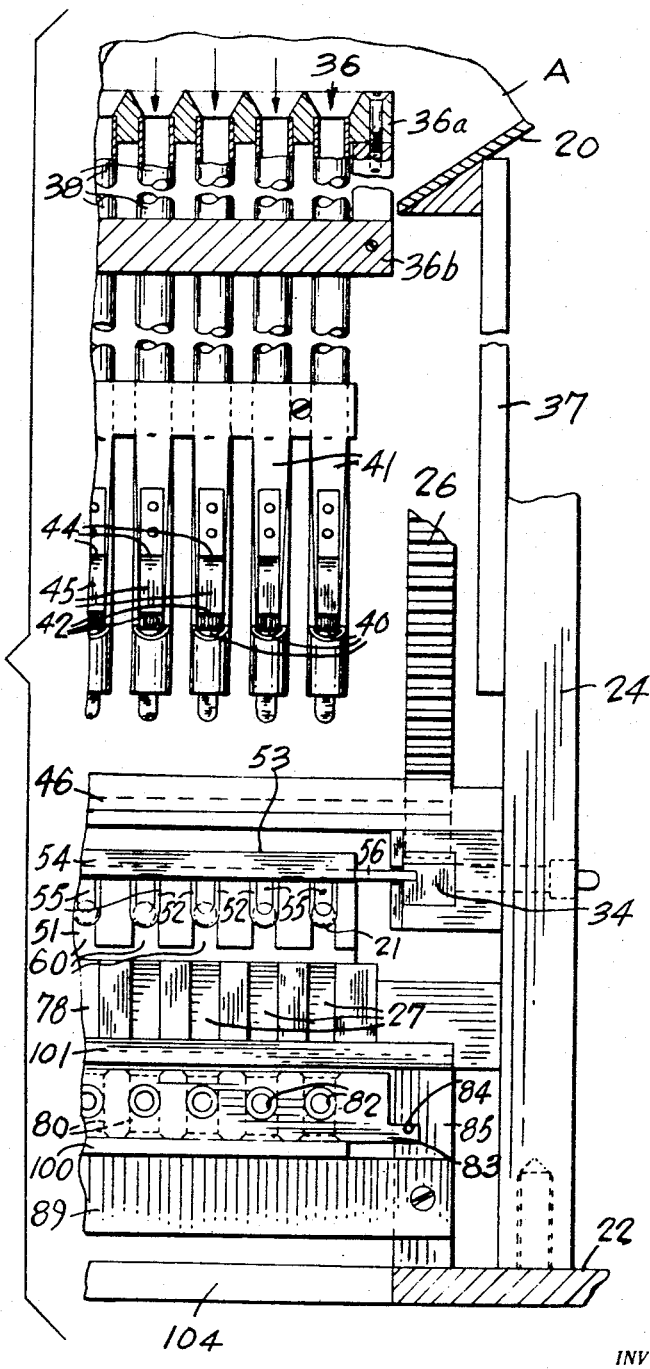
INVENTOR
Philip G. BAILEY
ATTORNEY Sept. 16, 1969   P. G. BAILEY   3,466,842
MACHINE FOR TREATING CAPSULES
Filed May 10, 1967   7 Sheets-Sheet 6

INVENTOR
Philip G. BAILEY
ATTORNEY

United States Patent Office 3,466,842
Patented Sept. 16, 1969

3,466,842
MACHINE FOR TREATING CAPSULES
Philip G. Bailey, Pierrefonds, Quebec, Canada, assignor to Smith Kline & French Laboratories, Philadelphia, Pa., a corporation of Pennsylvania
Continuation-in-part of application Ser. No. 580,306, Sept. 19, 1966. This application May 10, 1967, Ser. No. 651,336
Int. Cl. B65b 63/02, 13/20, 1/20
U.S. Cl. 53—124                4 Claims

ABSTRACT OF THE DISCLOSURE

An apparatus for taking filled hard gelatin capsules from a random pile and automatically orienting them, compacting them to a common length, and heat sealing them, so as to make them suitable for subsequent conventional handling.

---

This invention is a continuation-in-part of my copending application Ser. No. 580,306, filed Sept. 19, 1966, now abandoned.

The present invention relates to machines for treating capsules, and more particularly, capsules of the type having body portions and overlapping caps which telescope over the body portions lengthwise, and which are of a material which may be heat sealed by spot welding. The invention relates particularly, but not exclusively, to an automatic machine for sealing such capsules.

Machines are known for orienting empty hard gelatin capsules and filling powdered drugs into them, resulting in generally well sealed capsules. However, when filling conventional capsules with drugs in pelleted form, on existing machines, the abrasive properties of the powder are, of course, absent, causing a loss of their sealing effect that reliably holds powder-filled capsule caps and bodies together.

Consequently, alternate means are required to insure that pellet filled capsules are adequately sealed to avoid capsules separation during subsequent handling which involves packaging and drug administration.

The present invention is adapted for use in conjunction with capsule filling machines which lack a heat sealing means as an inherent feature of their operation.

In the construction of machines for treating capsules of the above type, another major problem encountered is concerned with bringing all the capsules to a common telescoped length, and to a common orientation, that is with the cap ends, for example, all lying in the same direction, so that the overlapping regions may be accurately welded. It will be appreciated that if some capsules are upside down in relation to others, or if their caps are insufficiently overlapped, a high proportion of sealing failures will result, due to inaccurate application of the welding element.

Furthermore, if spot welding is to be carried out, the welding element and capsule must be moved together very accurately, and for a carefully controlled period depending on the temperature employed, to ensure that a sufficient weld is obtained without injury to the capsule. It is also important to ensure that after being properly compacted the caps are not displaced again before sealing. Further difficulties are encountered in feeding capsules in succession from a reservoir containing closed capsules disposed in a random collection or heap.

Accordingly, it is one object of the present invention to provide in a capsule treating machine, means for feeding filled capsules successively from a random disposition in a reservoir.

It is a principal object of this invention to provide means for automatically heat sealing hard capsules which are already filled with pelleted drugs.

It is another object to provide means for bringing such capsules to a predetermined length and overlap and in particular to ensure that they are not afterwards disturbed before sealing. It is yet another object to provide means for orienting the capsules so that they are all turned in the same direction.

It is yet another object to provide means for accurately positioning the capsules in relation to spot welding means and for keeping the correct position for exactly the required time for accurate spot welding.

With these and other incidental objects in view, the invention comprises novel features of construction and combinations of parts, as set forth in the appended claims, and for a better understanding of the invention and so that its operation may be better understood, a preferred embodiment of a capsule sealing machine is hereafter described with reference to the drawings accompanying and forming part of the specification, and in which:

FIGURE 1 is a front elevational view of a capsule sealing machine in accordance with the invention;

FIGURE 2 is a side elevation of the right hand side of the machine of FIGURE 1;

FIGURE 3 is a plane view of the machine of FIG. 1.

FIGURE 5 is a view similar to FIGURE 4 showing the components in another position of the cycle;

FIGURE 6 is a view similar to FIGURES 4 and 5 showing the lower part of the machine in another position of the cycle;

FIGURE 7 is a vertical section along the line 7—7 of FIGURE 4;

FIGURE 10 is a view corresponding to a portion of FIGURE 8 during a different position of the cycle, and illustrating part of the orienting operation;

FIGURE 11 is a front elevational view, partly in section, of part of the orienting means, illustrating the operation of the latter;

Figure 4:
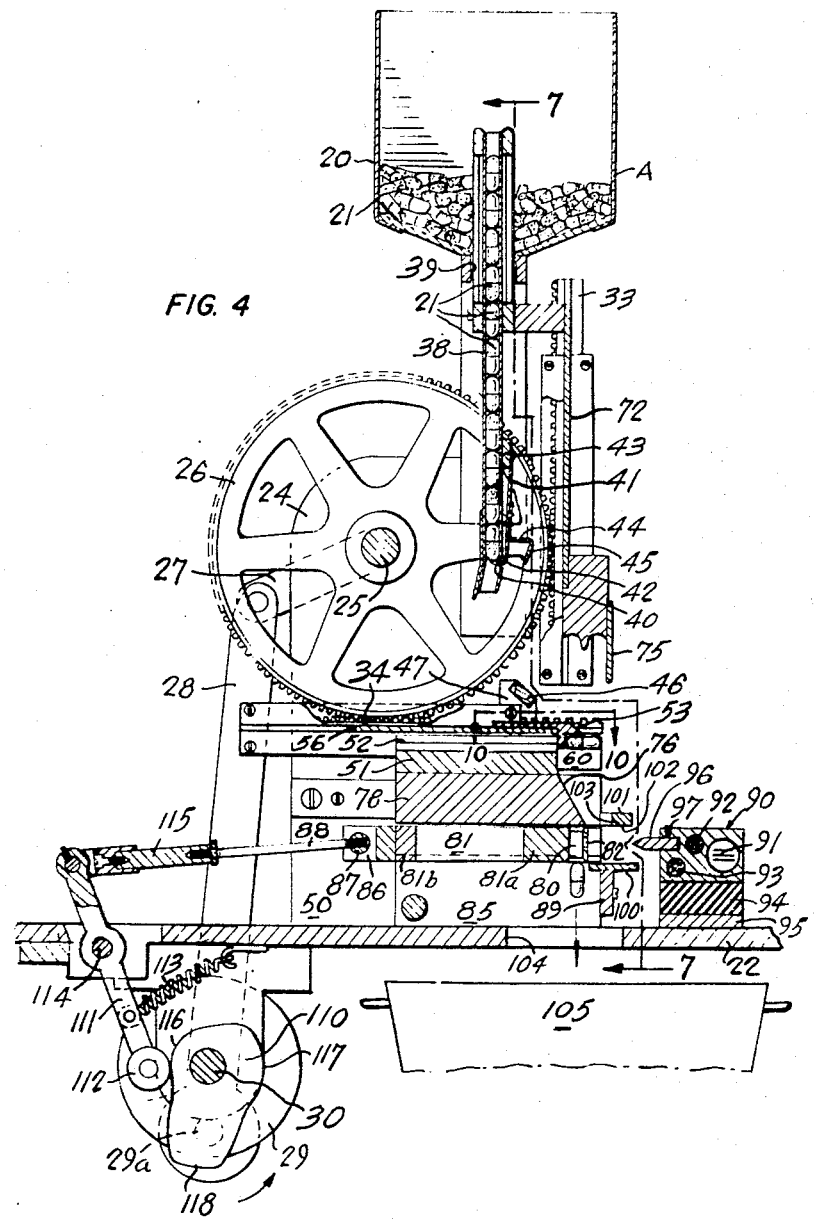
FIGURE 4 is an enlarged cross-section along the line 4—4 of FIGURE 1, illustrating the position of the components in one position of the operating cycle.
Figure 17:
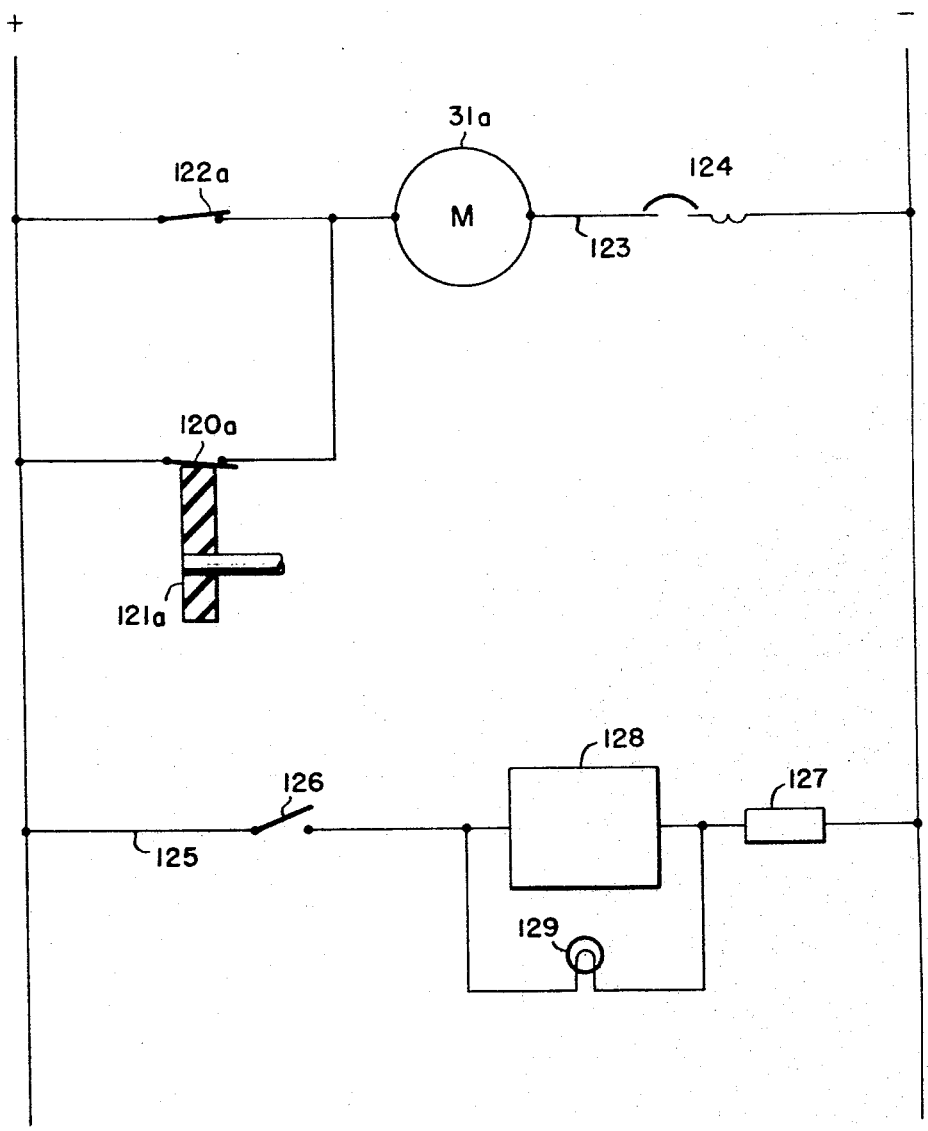

FIGURES 12, 13, 14 and 15 are views generally along the line 13—13 of FIGURE 11, FIGURES 13 and 15 showing a cycle position corresponding to that of FIGURE 11 and FIGURES 12 and 14 illustrating a cycle position immediately previous the cycle position of FIGURE 11, the figures showing the orientation of capsules which enter with different initial orientations;

FIGURE 16 is a view corresponding to a portion of FIGURE 4 illustrating the sealing means in position for sealing; and FIGURE 17 is a schematic view of an alternative motor and heater circuit for halting motor 31.

Referring to the drawings, FIGURES 1 to 3 show elevational and plan views of the capsule sealing machine forming the preferred embodiment of the present invention. However, the general functional means are more clearly depicted in FIGURE 5. In FIGURE 5, it will be seen that the machine is inclusive of a fixed reservoir A constituted by hopper 20 having downwardly sloping floor parts and an elongate opening 39 along the apex of the floor. The hopper 22 holds a random collection of capsules 21 which have been previously filled and loosely capped. The capsules are of the type more clearly represented in FIGURES 12 to 16 and formed with a relatively narrow body portion 21a and relatively wider cap portion 21b (FIGURE 13) of soluble, pharmaceutically acceptable, thermoplastic material, the cap portion sliding over the open end of the body portions so as partly to overlap. Conventionally, such capsules are sealed at the position of overlap by the application of heat.

Feeding means B are disposed below the reservoir A and feed the capsules successively to a first transfer means C where the capsules are moved into position for orientation. The capsules are then oriented by orienting means generally shown at D so that all the caps lie at the same (upper) end. After orientation, the capsules are moved by second transfer means E past compacting means generally indicated at F, where the capsules are compacted as they are forwarded for sealing by a sealing unit G. After sealing, the capsules are discharged at H. A drive unit I is provided to energize the various moving parts and to determine the synchronization of the various steps in the operation.

The machine comprises a platform 22 mounted on legs 23. Bolted to the platform 22 is a base structure 50 and, bolted thereto, upright side supports 24 between which is generally mounted the axle 25 of a pair of gear wheels 26 which are rigid with the axle 25 for movement together. Rigid with axle 25 is a crank 27 coupled to a connecting rod 28. The other end of the connecting rod 28 is coupled to a crank 29 mounted by a crank pin 29a to a motor drive shaft 30. The drive shaft 30 is driven by an electric motor 31 through a reduction gear box 32.

It will be appreciated that rotation of the drive shaft 30 causes oscillatory motion of the gear wheels 26 through a repeated arc, the end positions of which are shown in FIGURES 4 and 5.

The teeth of the gear wheels 26 are arranged to engage simultaneously a vertical twin rack 33 and a horizontal twin rack 34. The vertical rack 33 is slidably mounted upon vertical supports 35 bolted to side supports 24.

THE FEEDING MEANS

A vertically reciprocating frame 36, having an upper cross-piece 36a and a lower cross-piece 36b and constituting part of the feeding means B, is rigidly mounted to the vertical rack 33. The frame 36 is slideably mounted in a supporting structure 37, which supports the hopper 20 on each side of the floor opening 39, and which is in turn bolted to the supports 35. Cross-pieces 36a and 36b each comprise a row of parallel vertical bores in which are rigidly secured a row of tubes 38. The upper mouths of the tubes 38 at their junction with the cross-piece 36a are beveled to correspond with the slope of the floor of the hopper.

In operation, the feeder frame 36 and tubes reciprocate from a lower position illustrated in FIGURE 5 in which the beveled openings of the tubes form an extension of the sloping floor of the hopper 20 and an upper position illustrated in FIGURE 4 in which the tubes pass through the opening 39 in the floor of the hopper to a level substantially within the reservoir of capsules. This reciprocating movement induces capsules to fall into the tubes 38 so as to maintain them in a substantially full condition as illustrated in FIGURES 4 and 5. It will be apparent that, as illustrated, the capsules have no special orientation as they lie in the tubes 38, some of the cap ends being uppermost and some of the body ends being uppermost.

At their lower ends, the tubes 38 are bent slightly towards the rear of the machine, that is, to the left in FIGURE 4, and notches 40 are cut in their walls at the outside of the bend. A spring trigger 41 of resilient material such as phosphor bronze and having a curved trigger piece 42 is located along the lower part of each tube so that the trigger piece 42 extends into the notch of the tube 38 to retain the lowermost capsule as shown in FIGURE 4. The triggers 41 are mounted at their ends opposite to the triggers on a crossbar 43 secured to the forward sides of the tubes 38. Along the forward surface of each trigger is riveted a catch piece 44 having a lower portion bent forwardly and then downwardly in the form of a prong 45. As the bars move down to their lowermost position as illustrated in FIGURE 5, the prongs 45 engage the downwardly and forwardly sloping surface of a fixed cam member 46, which extends across the machine under the prongs and is mounted upon the machine base structure 50 by uprights 47. As the prongs 45 strike and slide along the upper surface of the cam member 46 at the bottom of the stroke of the feeding means B, they are moved forwardly so as to withdraw the catch members 42 from the notches 40 momentarily so as to release the lowermost capsule in each tube as shown in FIGURE 5.

THE FIRST TRANSFER MEANS

Located beneath the tubes 38 is the first transfer means generally indicated at C in FIGURE 5. This includes a platform 51 forming part of the base structure 50 and having along its upper surface a plurality of forwardly extending horizontal parallel troughs 52. One trough extends below each tube 38 so that as the lowermost capsules are released by the trigger means, they fall into the troughs 52 and lie along them horizontally, the troughs being of a width to receive the capsules as shown more clearly in FIGURE 7. After falling into the troughs the capsules are moved forwardly by a reciprocating member 53 which comprises a horizontal plate portion 54 lying on a transverse plate 56 which extends across the tops of the troughs 52 and the side edges of which are secured to the horizontal racks 34 which engage the gear wheels 26. Fingers 55 on member 53 extend downwardly into respective troughs 52 sufficiently to engage the rear ends of the capsules therein. Thus, the fingers 55 are reciprocated by the gear wheels between a rear position illustrated in FIGURE 5 behind the entering capsules to a forward position illustrated in FIGURE 4, where they are in position for orientation.

It will be appreciated that the rear position of reciprocating member 53 (FIGURE 5) corresponds with the lowermost end position of the feeder means B and correspondingly the forwardmost position member 53 corresponds with the uppermost position (FIGURE 4) of the feeder means, so that the latter co-operate to move successive rows of capsules into position for orientation.

ORIENTATION MEANS

Figure 8:
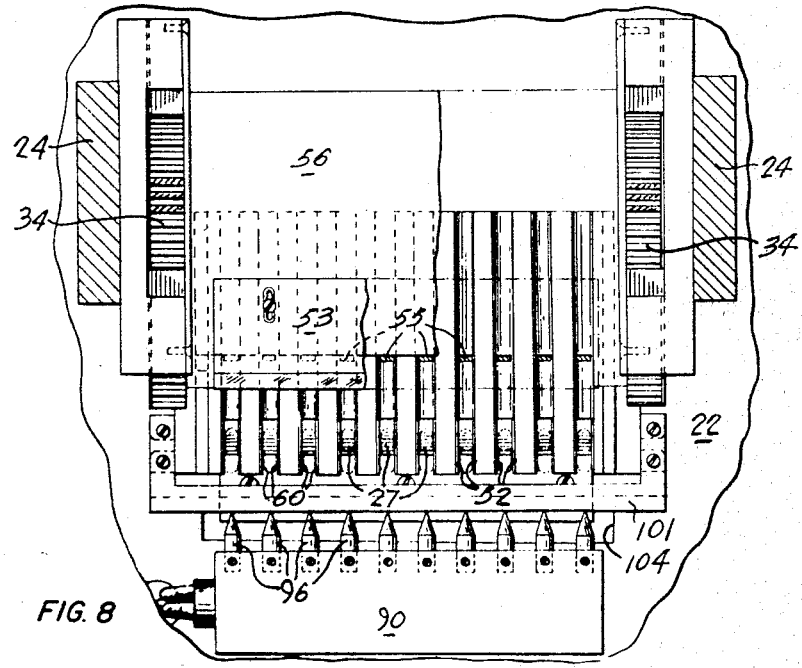
FIGURE 8 is a horizontal section with parts cut away taken along the line 8—8 of FIGURE 2.

The troughs 52 terminate forwardly in slots 60 which are open to the front and at the top and bottom. The slots 60 extend downwardly through the block 51 to its lower surface, the slots being of a length slightly greater than the length of a capsule as shown in FIGURE 8 and of a width which is so adjusted that the cap portions of the capsules form a frictional fit between the vertical walls of the slots. Therefore, as the capsules are moved forward by the fingers 55 to the orientation position shown in FIGURE 4 and FIGURE 8, caps 21a of the capsules rest lightly upon the shoulders 61 formed between the slot walls and the bottoms of the troughs 52 (FIGURE 7). It will be appreciated, as illustrated better in FIGURE 10, that some of the capsules will have their caps forwardmost and some will have their caps directed towards the rear. The operation of the orienting means is better illustrated in FIGURES 10 to 15. A generally comb shaped orienting member 70 is provided in the form of a block from which depend a row of blade portions 71 of a size which is a sliding fit in the slots 60, the blades 71 being located so as to fit one above each slot. The block 70 is bolted to flanges 72 of the vertical reciprocating rack 33. The block 70 is so located that in the upper position of the rack 33 (FIGURE 4), the blades 71 are clear of the slots 60 and in the lower position (FIGURE 5) the blades are pushed through the slots 60 carrying the capsules with them. Each blade 71 has a central tooth 71a, at the root of which extend forward and rearward concave shoulders 73, 74. The shoulders are generally symmetrical, but the forward shoulders are extended somewhat to clear the end of the block 51 and to allow the attachment of a guard plate 75 which prevents the capsules being pushed forwardly out of the slots as they are moved downwards. The central teeth 72 are located so as to strike the capsules substantially centrally as they rest above the slots in the orienting position. As the capsule is moved between the walls of the slots 60, the latter grip and frictionally engage the cap ends 21b while the body ends 21a move more freely. As a result, the capsules are rotated body end downwards independently of the original orientation of the capsules. This is clearly shown in FIGURES 12 to 15. A capsule which reaches the orientation position cap end forward as illustrated in FIGURE 12 is moved so that the forward shoulder 73 engages the cap as shown in FIGURE 3 as the capsule is moved downwards. Similarly, if the capsule reaches the orientation position with the cap end rearmost as shown in FIGURE 14, the capsules is turned so that the cap engages the rear shoulder 74 for downward movement. After engagement by the shoulders (FIGURES 13 and 15), the capsules are moved downwardly through the slots 60 from which they all emerge cap uppermost.

Disposed below the slots 60 is a forwardly sloping surface 75 formed at the forward end of a block 78 constituting part of the base structure 50. Along the surface 76 are formed downwardly extending parallel grooves 77 (FIGURE 11), which guide respective capsules cap end upwards to the second transfer means for compacting and sealing. The apparatus described heretofore is known to the art.

SECOND TRANSFER MEANS

As the capsules fall cap end upmost along the grooves 77 below the orienting means, they are received respectively in vertical chambers 80 of a forwardly and rearwardly reciprocating member constituted by frame 81 having a forward cross-piece 81a, rear cross-piece 81b interconnected by side pieces (FIGURES 6, 11). The chambers 80 are constituted by vertical bores, upwardly and rearwardly chamfered, in the forward transverse member 81a of the frame 81. The bores are of a size sufficiently large to receive a capsule upright. The front wall of each chamber is pierced with an approximately central aperture 82, the aperture 82 being located in the region of overlap of the cap and body portions of the capsule.

Figure 9:
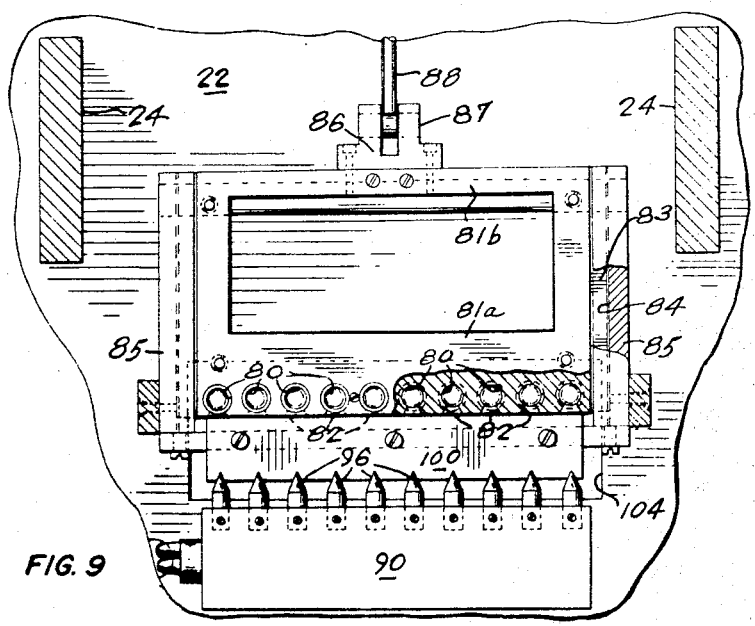
FIGURE 9 is a horizontal section with parts cut away, taken along the line 9—9 of FIGURE 2.

The side members of the frame 81 have flanges 83 sliding in horizontal grooves 84 in uprights 85 forming part of the base structure 50 (see FIGURE 7 and FIGURE 9). Centrally bolted to the rear of the cross-piece 81b is a mounting block 86, in which is generally mounted a crank pin 87 connected to a connecting rod 88 in turn connected to drive means to be described for imparting the necessary reciprocating motion to the frame 81.

COMPACTING MEANS

The base structure 50 is hollow between the vertical supports 85. Mounted to the front of the supports 85 is a cross-piece 89 (FIGURE 4) which is arranged to support a floor 100 which extends rearwardly sufficiently to be vertically aligned with the bottom of the sloping guide surface 76, and forwardly sufficiently to extend below part of heating elements 96 to be described. Bolted across the front of the base member 76 forwardly of the guide surface 76 is a compacting bar 101 having an adjustable height. The bar has a horizontal surface portion 102 which is spaced above the floor 100 by a distance which determines the final length of the capsules. The lower rear corner of the bar 101 is chamfered to provide a forwardly and downwardly sloping surface 103. As the row of capsules is moved forward in the chambers 80, the capsules pass between the compacting block 101 and the floor 100 and are compacted by the sloping surface 103 to the correct length, corresponding to the distance between floor 100 and surface 102, and immediately before engaging the sealing elements 96.

It will be appreciated that the location of the compacting means immediately before the sealing mean completely eliminates any possibility of the capsules loosening prior to being sealed, which possibility might arise, for example, if the compacting means were located prior to orientation of the capsules. After sealing, the capsules are withdrawn clear of the rear end of the floor 100 and dropped through the space between the uprights 85 and through a slot 104 provided in the platform 22 to a receiving container 105. Thus, the slot 104 cooperates with the floor 100 and reciprocating frame 81 to constitute the discharge means generally indicated at G.

SEALING MEANS

Located forwardly of the base structure 50 is a heated sealing block 90 which is maintained at a suitable temperature for sealing by means of thermostatically controlled elements located in apertures 91, 92 and 93. The heating means may comprise electrical resistance elements and such elements and their thermostatic control are sufficiently well known to require no further description. The block 90 is mounted upon an insulating pad 94 which in turn is supported upon the platform 22, if necessary, by means of a packing element 95 of a thickness adjusted to give a correct height to the block. Extending from horizontal bores in the block 90 is a row of pointed heating elements 96. The elements 96 are retained by grub screws 97 and are located in such a position that at the forwardmost position of the frame 81 points of the elements 96 extend through the apertures 82 sufficiently to spot weld the caps to the body portions in the region of overlap as depicted in FIGURE 16.

It will be understood that other means of welding solid parts are within the scope of this invention, for example, ultrasonics may be employed for this purpose.

DRIVE MEANS

The disposition of the motor 31, gear box 32 and drive shaft 30, together with the crank means constituted by components 29, 27, 25 and gear wheels 26, have already been described. The latter components give the necessary reciprocating action to the feeding means B and transfer means C and also to the orienting means D, the cooperation of which has also been described.

In the preferred embodiment, the cycle or movement of the reciprocating frame 81 for compacting and sealing is more complicated than can be provided by a simple crank mechanism, since the frame is held stationary during certain periods of the cycle, that is, when the chambers 81 are located beneath the guide grooves 77 for receiving the capsules after orientation, and for a brief period while the capsules are in contact with the sealing elements 96. This is accomplished through the provision of a cam and cam follower mechanism for reciprocation of the frame 81.

The mechanism is inclusive of a cam 110 rigid with the drive shaft 30, and a cam follower lever 111 having a roller 112 at its lower end which is held in contact against the cam 110 by a tension spring 113, the lever 111 being mounted on a rocker 114 pivotally mounted to the platform 22, through an opening in which the lever 111 passes. The upper of lever 111 is pivotally coupled to the connecting rod 88 through an adjustable extension rod 115, which allows the position of the frame 81 relative to lever 111 to be adjusted. The cam rotates in the direction shown by the arrows in FIGURES 4 and 5 and includes a short radius 116, an intermediate radius 117 and a long radius 118, the centers of the radii being approximately, although not exactly 120° one to another. It will be appreciated that the frame 81 is held for a short space of time at its rearmost position when the roller 112 is in contact with the short radius 116, allowing discharge of the sealed capsules from the chambers 80. As the cam rotates, the frame 81 is moved forward until the roller 112 makes contact with the intermediates radius 117, at which time the chambers 80 are located over the floor 100 and under the grooves 77 to receive a row of capsules from the orienting means. The radius 117 is of longer circumferential extent than the other two. The chambers 80 are held in this position as the roller 112 moves over the radius 117 allowing sufficient time for the capsules to be collected. The roller 112 then moves over the long radius 118 bringing the capsules against the heating elements 96. The radius 118 is of relatively short circumferential extent, sufficient to allow the capsules to be maintained against the heating elements 96 for the time required to provide a good seal.

Thus, the circumferential magnitude of the long radius 118 will depend upon the temperature of the heating block 90. For example, the block may be maintained at 100° C., the radius 118 enclosing about 30° which at 20 revolutions per minute allows the heating elements 96 to make contact with the capsules for about ¼ second.

The roller 112 then moves back to the narrow radius 116 causing the frame to move backwards rearwardly of the floor 100 to discharge the sealed capsules and to recommence the cycle.

The orientation of the cam on the drive shaft 30, with respect to the position of the crank pin 29a is shown clearly in FIGURES 4 and 5. When the crank pin 29a is in the top dead center position shown in FIGURE 5, the roller 112 is approximately central on the intermediate radius 117. This means that as a fresh row of capsules falls from the feeding means B into the grooves 52, the previous row of capsules is being received in the chambers 80 of the second transfer means E. Similarly when the feeder means B is at its upper position and one row of capsules is in position for orientation, the previous row of capsules is being discharged.

As shown in FIGURE 3, a microswitch 120 may be provided if desired to halt the motor 31 in such a position that the orienting member 70 and cover plate 75 are clear of the groove member 51 and also so that the chambers 80 are clear of the heating elements 96, that is, in a position approximating to that of FIGURE 4. This prevents a row of capsules being stopped in the sealing position and allows access to the slots 60 so that any capsules remaining there be dislodged before recommencing the operation. The microswitch 120 is operated by a cam 121 and a motor lead as shown in FIGURE 3 is passed to the motor via the microswitch.

An alternative circuit is shown in FIGURE 17. While main switch 122a is closed, motor 31a is in operation. The operation of the motor causes a cam 121a to operate, which cam opens and closes limit switch 120a. The limit switch is disposed so as to be closed while frame 81 is in the fully forward position as in FIGURE 6, and to be open while frame 81 is in the fully rearward position as in FIGURE 4. Lead 123 is optionally provided with an overboard switch 124.

In operation, therefore, when main switch 122a is open the motor 31a will still continue to operate until frame 81 is retracted from the sealing position of FIGURE 6. Limit switch 120a will then open, permitting the frictional forces inherent in the machine to effectively stop all motion to a point where frame 81 is in the retracted position of FIGURE 4.

A separate circuit 125 is provided with a manual heater switch 126, heater 127, an a power stat 128. This circuit may also be provided with a pilot light 129 to visually inform when the heater 123 is energized.

While one embodiment only of this invention has been illustrated and described in detail, it is to be expressly understood that the invention is not to be limited thereto. Various changes may also be made in the design and arrangement of the parts without departing from the spirit and scope of the invention as the same will now be understood by those skilled in the art.

What is claimed is:

1. In a machine for treating capsules having body portions, and caps overlapping parts of said body portions, the combination comprising:
   means for orienting and feeding closed capsules with said caps all oriented in one direction;
   means to support a plurality of capsules comprising a platform and a movable member having an opening therethrough to receive oriented capsules;
   a plurality of spot welding elements mounted in parallel array adjacent said capsule supporting means;
   means providing first relative reciprocating movement between the capsules while in said supporting means and said elements to engage one another, thereby sealing the capsules, and disengaging therefrom, and
   means providing second relative reciprocating movement between said movable member and the platform to remove the support of the capsules by the platform, permitting capsules to drop downwardly.

2. The combination of claim 1, further comprising compacting elements aligned a predetermined distance apart on opposite respective sides of said supporting means, and positioned so that when said plurality of capsules is moved therebetween, the compacting of said capsules to a length corresponding to said predetermined distance occurs immediately prior to their engaging said welding elements.

3. The combination of claim 1 including drive means operatively connected to said capsule supporting means for reciprocating the latter, wherein said drive means includes a rotating cam and cam follower adapted to maintain said capsules in contact with said welding elements for a predetermined period of time.

4. The combination of claim 1 wherein said welding elements further comprise heating elements adapted to be maintained at a suitable temperature for spot welding said caps to said body portions thereof in the regions of overlap of the cap and body portions of the closed capsules.

References Cited

UNITED STATES PATENTS

| 2,200,577 | 5/1940 | Lozon | 53—24 |
| 2,494,484 | 1/1950 | Nicolle | 53—141 X |
| 2,775,084 | 12/1956 | Stirn | 53—24 X |
| 2,819,575 | 1/1958 | Ervine | 53—143 |
| 2,846,830 | 8/1958 | Bossi | 53—143 X |
| 2,908,124 | 10/1959 | Hagen | 53—141 X |
| 3,408,926 | 11/1968 | Rogerson | 53—143 X |

WAYNE A. MORSE, JR., Primary Examiner

U.S. Cl. X.R.

53—141, 143, 151